United States Patent [19]
Smith

[11] Patent Number: 5,249,342
[45] Date of Patent: Oct. 5, 1993

[54] EXTRACTOR

[76] Inventor: John A. Smith, 7 South Road, Templefields, Harlow Essex CM20 2AP, Great Britain

[21] Appl. No.: 825,606

[22] Filed: Jan. 24, 1992

[51] Int. Cl.⁵ ............................................. B23P 19/04
[52] U.S. Cl. ..................................... 29/252; 29/263; 29/253
[58] Field of Search ................. 29/252, 253, 256, 259, 29/263, 255, 282; 269/48.1, 48.3, 48.4

[56] References Cited

U.S. PATENT DOCUMENTS

| | | | |
|---|---|---|---|
| 4,214,362 | 7/1980 | Beard | 29/252 |
| 4,249,293 | 2/1981 | Schulberg | 29/263 |
| 4,369,569 | 1/1983 | Armstrong, Jr. et al. | 29/252 |
| 4,389,763 | 6/1983 | Marsh, Jr. | 29/252 |

Primary Examiner—Bruce M. Kisliuk
Assistant Examiner—Eileen P. Morgan
Attorney, Agent, or Firm—Waldron & Associates

[57] ABSTRACT

A device for pulling a bushing from a housing comprises a collet having legs which are expanded outwards by a cam action. The collet and cam are mounted on a shaft and the collet legs pushed onto a conical cam surface of the cam to expand them outwards. Ribs on the outer surface of the legs engage the end of the bushing as the shaft is withdrawn through the bushing and housing, pulling the bushing from the housing.

10 Claims, 1 Drawing Sheet

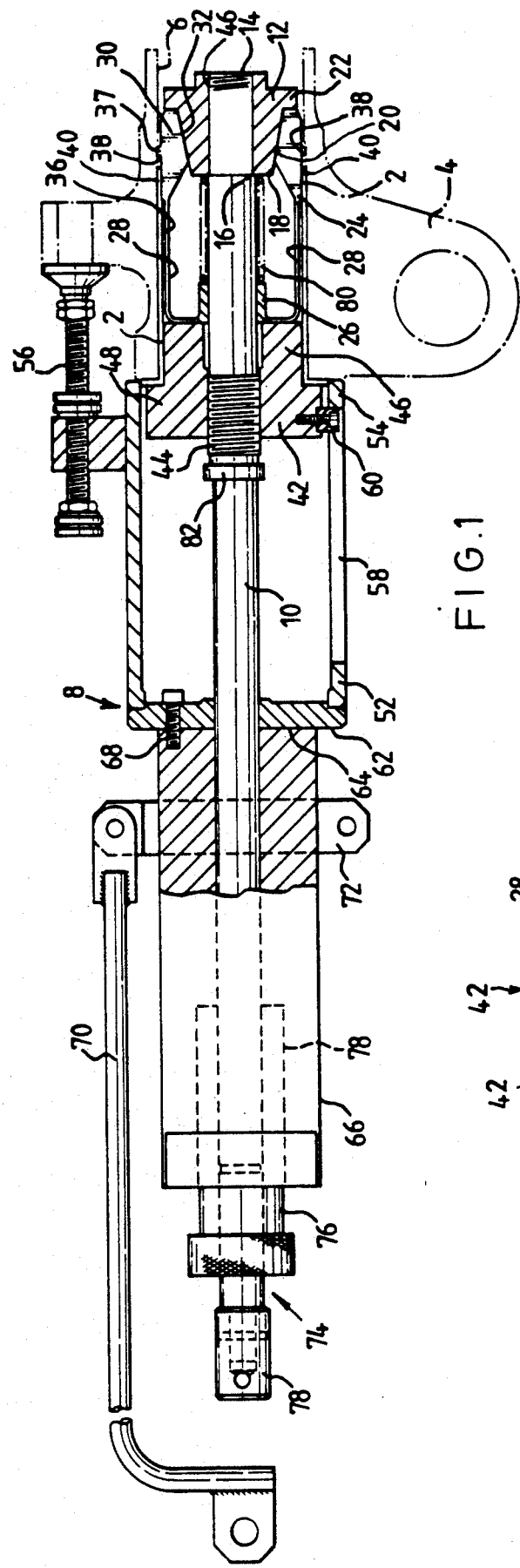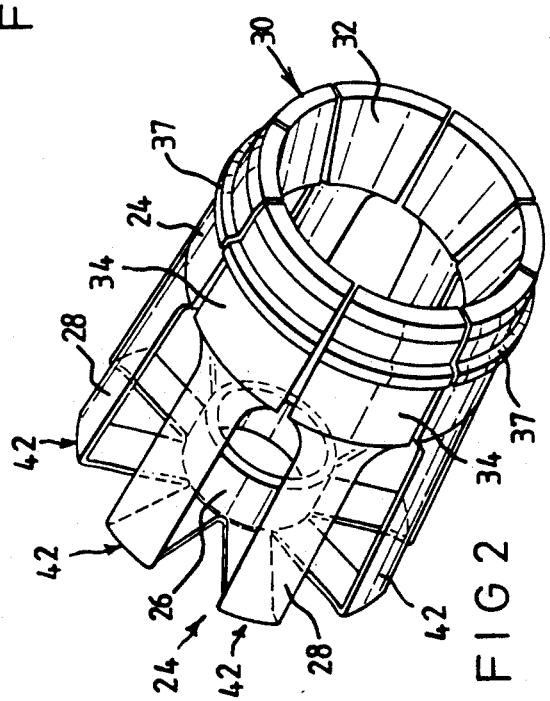

EXTRACTOR

INTRODUCTION AND BACKGROUND

The present invention relates to an extractor for bushings, sleeves, liners and the like.

Present methods of extracting bushings, sleeves, liners and the like (hereinafter referred to generally as bushings) which are an interference fit in a housing often result in damage to the bushing and/or the housing.

Using a drift to drive out the pushing will score the housing and deform the end of the bushing.

SUMMARY OF THE INVENTION

The present invention provides a device for extracting a bushing from a housing, in which a collet has a plurality of legs which are expanded outwards by a cam action. The outer surfaces of the legs carry lips for bearing on an end face of the bushing, and the legs are expanded out so that the lips extend out to a predetermined diameter which is slightly less than the inner diameter of the housing. The expanded collet is then used to pull the bushing from the housing.

More particularly, a pulling shaft carries a cone shaped cam at one end which is inserted through the length of the bushing. The collet is carried on the shaft and the legs are urged up onto the cam by a nut carried on a thread on the shaft.

Ends of the collet legs abut a flange at the base of the cone to limit the movement of the legs on the cam, and hence allow an accurate pre-determination of the expansion of the legs.

The shaft is pulled from the housing, carrying the cam, collet, and bushing with it, preferably by a hydraulic ram. The shaft extends through a centerless ram, and the ram reacts against the housing, preferably via a sleeve into which the bushing can feed as it leaves the housing.

By providing a system in which the collet legs are expanded to a fixed, pre-determined amount, the operator can be assured that the collet is expanded sufficiently to provide adequate purchase on the end of the bushing, whilst avoiding damage to the housing.

The device of the invention is particularly suitable for removing bushings from aircraft components, such as the landing gear. The device is also useful in mining, marine and transportation applications.

BRIEF DESCRIPTION THE DRAWINGS

FIG. 1 is an axial cross-section view through a pulling device forming a first embodiment of the invention; and FIG. 2 is a perspective view of a collet of the embodiment of FIG. 1, in a contracted condition.

DESCRIPTION OF THE PREFERRED EMBODIMENT

FIG. 1 shows a particularly preferred embodiment of the invention, which is shown positioned for removing a bushing 2 from an aircraft landing gear component 4. The bushing 2 is housed in a cylindrical housing 6.

The pulling device 8 of the invention comprises a central pulling shaft 10. A cam member 12 is screwed onto a threaded end 14 of the shaft 10 and a forward end 18 of the cam member 12 abuts a shoulder 16 on the shaft.

The cam member 12 tapers outwards from the forward end 18 to form a frusto-conical cam surface 20 and ends in a peripheral flange 22.

Shown in its expanded condition is a collet 24 which is seen more clearly in FIG. 2 in its contracted condition. The collet 24 has a central boss 26 which is a sliding fit on the shaft 10. A plurality of legs 28, eight in the embodiment shown, extend radially outwardly from the boss 26 and then axially, generally to form a cylinder, the legs 28 being separated to allow them to spring inwardly at their free ends 30. The free ends 30 each have an inner surface 32 in the form of a frusto-conical segment which lays flat against the surface 20 of cam member 12 when the collet legs 28 are fully opened apart. Outer surfaces 34 of the ends 30 are close, but not tight, against the inner surface 36 of the bushing 2 when the legs 28 are fully opened apart. Engagement means in the form of a circumferentially extending lip or rib 37 is provided on each surface 34 and has a radially extending surface 38 which abuts against an end 40 of the bushing 28. The collet 24 and cam 12 are machined from high tensile treated carbon steel, such as EN24' T'.

The collet 24 is machined to its expanded shape, as seen in FIG. 1, and the outer surface 42 of each leg 28 is shot peened, which causes the legs to bend resiliently inwards, to the form seen in FIG. 2. The degree of bend is sufficient to allow the collet 24, with the legs sprung inwardly, to pass into the bushing 2.

The collet 24 and cam 12 are dimensioned so that when the ends 30 of the legs 28 abut the flange 22, the ribs 37 are a few thousandths of an inch clear of the inner wall of the housing 6, typically five thousandths clearance is provided on the diameter. Since the bushing 2 is likely to be worn, no reliance is placed on the internal diameter of the bushing to limit the outward movement or positioning of the leg ends 30.

The collet 24 is pushed onto the cam surface 32 by a collar 42 which is threadedly engaged on the shaft 10, the thread 44 being of opposite hand to the thread 46 securing the cam 12 on the shaft 10.

The collar 42 has a central boss 46 which slides within the bushing 2 and bears on the boss 26. A flange 48 is arranged to bear on an outer end 50 of the bushing 2, or on the component 4 if the bushing is let fully into the housing 6. The collar 42 and collet 24 are dimensioned so that when the flange 48 abuts the end 50 of the bushing 2, the ribs 37 just clear the end of the bushing 2.

A cup 52 is a sliding fit on the shaft 10 and its open end 54 bears on the component 4, clear of the bushing 2. Where there is not sufficient bearing area around the bushing 2, an adjustable leg assembly 56 is provided to bear on another part of the component 4. The cup 52 has one or more axial slots 58 which each receive a guide pin 60 screwed to the flange 48, the pin(s) 60 serving to prevent rotation of the collar 42 relative to the cup 52.

The cup 52 at its closed end 62 is mounted on an end face 64 of a hollow central hydraulic ram 66, the shaft 10 passing through the ram 66. The cup is fixed against rotation relative to the ram 66, for example by a screw 68, or the cup may be held on by magnets, an aperture in the end 62 cooperating with a pin on the end face 64 of the ram 66 to prevent rotation of the cup.

A support bar 70 is pivotally attached to a collar 72 on the ram 66 for slinging the apparatus from a jig or the like to take the weight of the apparatus.

At the outer end 74 of the shaft 10, a nut 76 is threaded on the shaft 10 and is arranged to be tightened up against the ram piston 78, (shown in dotted outline) the piston moving to the left in the drawing.

A knurled nut 78 is screwed on the outer end 74 of the shaft 10.

In operation, the cup 52 is located on the end face 64 of the ram 66 and the shaft end 74 slid through the cup and ram and nuts 76 and 78 screwed onto the shaft end. The collar 42 is slid over the shaft end 14 and screwed down towards the ram 66. The collet 24 is then slid over the shaft end 14 and a spring 80 slid over the shaft and the cam 12 screwed into place. The spring 80 serves to space the collet 24 from the cam 12 until the collar 42 is tightened. In this condition the legs 28 of the collet 24 are contracted (bent inwardly) and so the cam 12 and collet 24 can be slid into the bushing until the flange 48 on the collar 42 abuts the end of the bushing. The shaft 10 is then rotated (using nut 78) to screw the collar 42 towards the cam 12, (threads 44,46 being of opposite hand). The flange 48 is pressed against the end of the bushing 2 so that as the legs 28 expand outwards the ribs 37 are clear of the outer end of the bushing. The collar is prevented from rotating by the pins 60 in slots 58. The operator will feel when then ends 30 of the legs 28 have abutted the flange 22, which is when the collet 24 is fully opened.

The nut 76 is then screwed down onto the piston 78 and the ram 66 operated to push the nut 76 and the shaft 10, to the left in the drawing. The ribs 37 abut the end of the bushing 2 and so the bushing is drawn out of the housing, into the cup 52.

A shoulder 82 on the shaft 10 limits the movement of the shaft 10 through the ram, to prevent force being applied to the collar 42.

Where the throw of the ram is not sufficient to withdraw the bearing in one movement, a spacer can be added between the nut 76 and ram 66, or between the cup 52 and the component 4 after contracting the ram, and the ram then expanded again.

It will be appreciated that the cam 12, collet 24, collar 42 and cup 52 are all dimensioned to suit a particular bushing in a particular component. Although this requires a large number of parts, a service kit for a particular application, such as aircraft landing gear, can be put together. The saving in time and cost on removal of bushings readily compensates for the cost of providing dedicated components for each bushing. By machining each collet and cam pair to close tolerances, it is possible to ensure that the lands 38 on ribs 37 abut squarely on the end of the bushing 2 and the ribs 37 do not foul the surface of the housing 6.

After use, the shaft 10 is screwed down through the collar 42 to release the collet 24 from the cam 12, the resilience of the legs 28 causing the ends 30 to contract inwardly to release the bushing 2.

It will be appreciated that for smaller bushings the ram 66 need not be used. A nut such as nut 76 may be screwed down the shaft 10 to abut the cup 52 and draw the shaft through the cup. Also, the cam may be integrally formed on the shaft.

Various modifications may be made to the described embodiment and it is desired to include all such modifications as fall within the scope of the accompanying claims.

What is claimed is:

1. A device for extracting a bushing, sleeve or liner from a housing, said device comprising a shaft, a collet mounted on the shaft and having a plurality of resilient legs extending axially of the shaft, said legs being movable between a retracted position and an expanded position, and a cam on the shaft, said shaft and collet having an outer diameter less than the inner bore of the bushing, sleeve or liner when said legs are in said retracted position, means being provided for moving said cam relative to said collet legs to expand said legs outwardly to a predetermined, maximum outer diameter wherein the ends of said legs abut a flange on the cam to limit expansion, and engagement means on said legs for engaging an axial end wall of the bushing when said legs are in the expanded position, means to withdraw the device from the housing with said legs in the expanded position, with said engagement means engaging said axial end wall of the bushing, sleeve or liner to withdraw the bushing, sleeve or liner from the housing with the collet.

2. A device as claimed in claim 1, wherein the engagement means comprises a rib on an outer surface of a leg.

3. A device as claimed in claim 1, wherein the collet is dimensioned so that an outer diameter of the engagement means is a predetermined amount less than an inner diameter of the housing when the legs of the collet are fully expanded by the cam.

4. A device as claimed in claim 1, wherein the collet is urged onto the cam by a collar threadedly mounted on the shaft.

5. A device as claimed in claim 1, wherein the collet legs are resilient and are normally in the retracted position, the cam urging the legs outwardly against the resilience of the legs.

6. A device as claimed in claim 5, wherein the collet legs are shot peened on an outer surface thereof.

7. A device as claimed in claim 1, wherein the shaft is withdrawn by a hollow centered ram.

8. A device as claimed in claim 1, wherein the cam is fixed relative to the shaft during operation of the device.

9. A device for extracting a bushing from within a housing, said device comprising:
   a shaft which, in use, is inserted within the housing and an inner bore of the bushing from a first end of the housing,
   a collet mounted on the shaft and having a plurality of legs which extend axially of the shaft and are movable between a retracted position and an expanded position, said collet sized to be inserted in the inner bore of the bushing with the legs in the retracted position so that ends of the legs exted axially beyond the axial end wall of the bushing distal of the first end of the housing,
   a cam on the shaft having a flange, and
   means for moving the cam relative to the collet legs to expand said legs outwardly to a predetermined maximum outer diameter by an abutting engagement of said flange with the ends of said legs,
   engagement means on the legs for engaging the axial end wall of the bushing when the legs are in the expanded position, and
   means for withdrawing the shaft, cam and collet from the housing when the legs are in the expanded position,
   the engagement means engaging the axial end wall of the bushing to withdraw the bushing from the housing with said collet.

10. A device as claimed in claim 9, wherein said cam is fixed at an end of said shaft, and said collet comprises a central boss which is a sliding fit on said shaft and said plurality of legs extending axially of the shaft and toward the cam, each having an inner surface which engages the cam such that movement of the central boss toward said cam causes said legs to move outwardly to the expanded position, a stop being provided on said cam for engagement by the legs to prevent further movement of said collet relative to said cam when the legs have reached the expanded position and a rib is provided on an outer surface of each leg for engagement with the axial end wall of the bushing, the ribs defining a predetermined outer diameter which is less than an internal diameter of the housing when said legs are in the expanded position.

* * * * *